(12) United States Patent
Dworzecki et al.

(10) Patent No.: US 12,441,431 B2
(45) Date of Patent: Oct. 14, 2025

(54) SHOCK ABSORBTION SYSTEM FOR AN ELECTRIC MONOCYCLE

(71) Applicants: Ryszard Dworzecki, Wrocław (PL); Ryszard Bator, Janowice Wielkie (PL)

(72) Inventors: Ryszard Dworzecki, Wrocław (PL); Ryszard Bator, Janowice Wielkie (PL)

( * ) Notice: Subject to any disclaimer, the term of this patent is extended or adjusted under 35 U.S.C. 154(b) by 0 days.

(21) Appl. No.: 18/699,887

(22) PCT Filed: Sep. 28, 2022

(86) PCT No.: PCT/PL2022/000055
§ 371 (c)(1),
(2) Date: Apr. 9, 2024

(87) PCT Pub. No.: WO2023/063836
PCT Pub. Date: Apr. 20, 2023

(65) Prior Publication Data
US 2024/0417026 A1 Dec. 19, 2024

(30) Foreign Application Priority Data
Oct. 11, 2021 (PL) .......................... 439194

(51) Int. Cl.
*B62K 25/22* (2006.01)
*B62K 1/00* (2006.01)

(52) U.S. Cl.
CPC ................. *B62K 25/22* (2013.01); *B62K 1/00* (2013.01)

(58) Field of Classification Search
CPC ......... B62K 25/22; B62K 1/00; B62K 11/007
See application file for complete search history.

(56) References Cited

U.S. PATENT DOCUMENTS

| 3,974,892 | A | 8/1976 | Bolger | |
|---|---|---|---|---|
| 8,985,610 | B2 * | 3/2015 | Juan | B60G 3/185 280/285 |
| 10,010,784 | B1 * | 7/2018 | Doerksen | B62D 51/02 |
| 11,753,104 | B1 * | 9/2023 | Njeim | B62K 11/007 180/7.1 |
| 2023/0286672 | A1 * | 9/2023 | Dougherty | B60G 3/207 |

FOREIGN PATENT DOCUMENTS

| EP | 0279763 A2 | 8/1988 | | |
|---|---|---|---|---|
| FR | 1143163 A | 9/1957 | | |
| WO | 99/44880 A1 | 9/1999 | | |
| WO | WO-2012047127 A1 * | 4/2012 | ............... | B62K 1/00 |
| WO | WO-2024063749 A1 * | 3/2024 | | |

OTHER PUBLICATIONS

International Search Report, dated Mar. 16, 2023, issued in the relevant international patent application No. PCT/PL2022/000055.

* cited by examiner

*Primary Examiner* — Toan C To
(74) *Attorney, Agent, or Firm* — Andrzej Malarz, Esq.

(57) ABSTRACT

A shock absorption system for an electric unicycle comprising a system of movable rigid members (1), (2), (3), pivotally connected to each other and to a shock absorber (4) forming a closed kinematic chain which has two interconnected loops—one in a shape similar to a trapezoid, and other resembling a triangle pivotally attached to a rigid frame at three points, where the top and bottom levers are oriented parallel to each other in all positions of the kinematic chain, and the shock absorber (4) is oriented predominantly vertically at an angle different from zero degrees relative to a direction of cushion forces.

2 Claims, 3 Drawing Sheets

SHOCK ABSORBTION SYSTEM FOR AN ELECTRIC MONOCYCLE

CROSS-REFERENCE TO RELATED APPLICATIONS

This is a 35 U.S.C. § 371 application to enter the national phase in USA of the international patent application PCT/PL2022/000055, filed on Sep. 28, 2022, claiming a priority of Polish patent application P.439194, filed on Oct. 11, 2021, a content of each of which is incorporated by reference to the present patent application.

FIELD OF INVENTION

The subject of the patent is a shock absorption system, which is used for example in the automotive industry, in particular in a unicycle, e.g. an electrically powered one. The system comprises an arrangement of movable rigid members coupled to a fixed frame. In the disclosed embodiment, the system of movable rigid members is symmetrical with respect to a vertical plane, which plane is also the plane of symmetry of the driven wheel of the unicycle, e.g. an electrically powered one.

DESCRIPTION OF RELATED ART

There are known shock absorption systems for an electric unicycle in which the shock absorber used to cushion the load being carried is located in the vertical axis and is therefore weighted with the load being carried. This has a negative effect on the service life of the shock absorber itself as well as on its damping performance. There are also known shock absorption systems, in which the shock absorbing stroke, i.e. travel in the vertical direction, is realised by means of members forming progressive kinematic pairs, i.e. sliders. These systems are prone to increased failure rates and faster wear and tear due to the friction phenomenon occurring in such sliders.

SUMMARY OF INVENTION

The essence of the shock absorption system of an electric unicycle made up of an arrangement of movable rigid members (1), (2), (3) and (4) connected to each other pivotally and forming a closed kinematic chain is characterised by the fact that this chain is a quadrilateral with a shape similar to a trapezoid, the members (1) and (2) are oriented parallel to each other at each position of the closed kinematic chain composed of members (1), (2), (3) and (4), the system of movable rigid members (1), (2), (3) and (4) is pivotally connected to the rigid frame (5) at two points, shock absorber (4) being part of the closed kinematic chain composed of members (1), (2), (3) and (4) is oriented at an angle different from zero degrees from the direction of the forces being cushioned.

The advantage of the shock absorption system being subject of the invention is that it does not contain progressive kinematic pairs in the form of sliders, sliding against each other, guiding cushioned mass along the desired direction of cushioning, i.e. the vertical axis.

BRIEF DESCRIPTION OF THE SEVERAL VIEWS OF THE DRAWINGS

The object of the solution is shown in FIG. 1, where the shock absorption system is shown in side view, and in FIG. 2 in isometric view. The rigid parts of the system are formed by two members (1), here named upper rocking lever, a symmetrical member (2) here named lower rocking lever, two members (3) here named arms, a shock absorber (4) and a member (5) here named frame. The successive members of this system form turning kinematic pairs, i.e. one member is displaced relative to the other by rotation within a certain angular range relative to the centre of mutual bearing of these members. The system of successive rigid members connected pivotally with each other forms a closed kinematic chain, characterised by the fact that this chain is a quadrilateral with a shape similar to a trapezoid. This quadrilateral is formed in turn by member (1), shock absorber (4), member (2) and member (3).

DETAILED DESCRIPTION OF THE INVENTION

Figure 1:
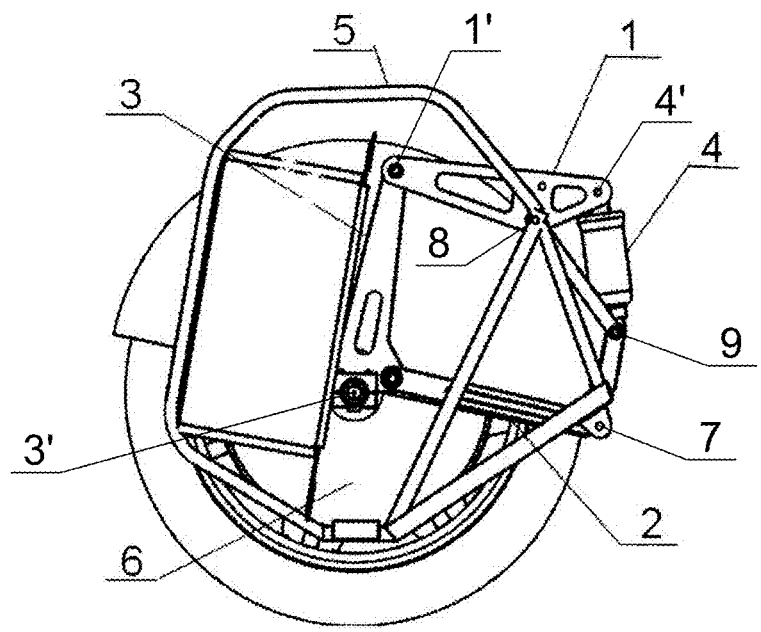
Figure 2:
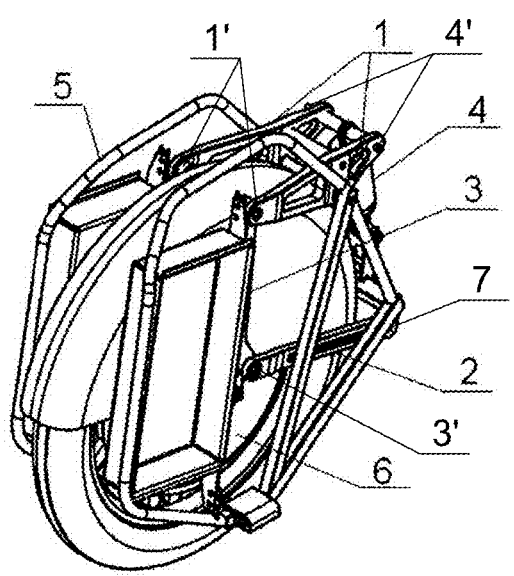
Figure 3:
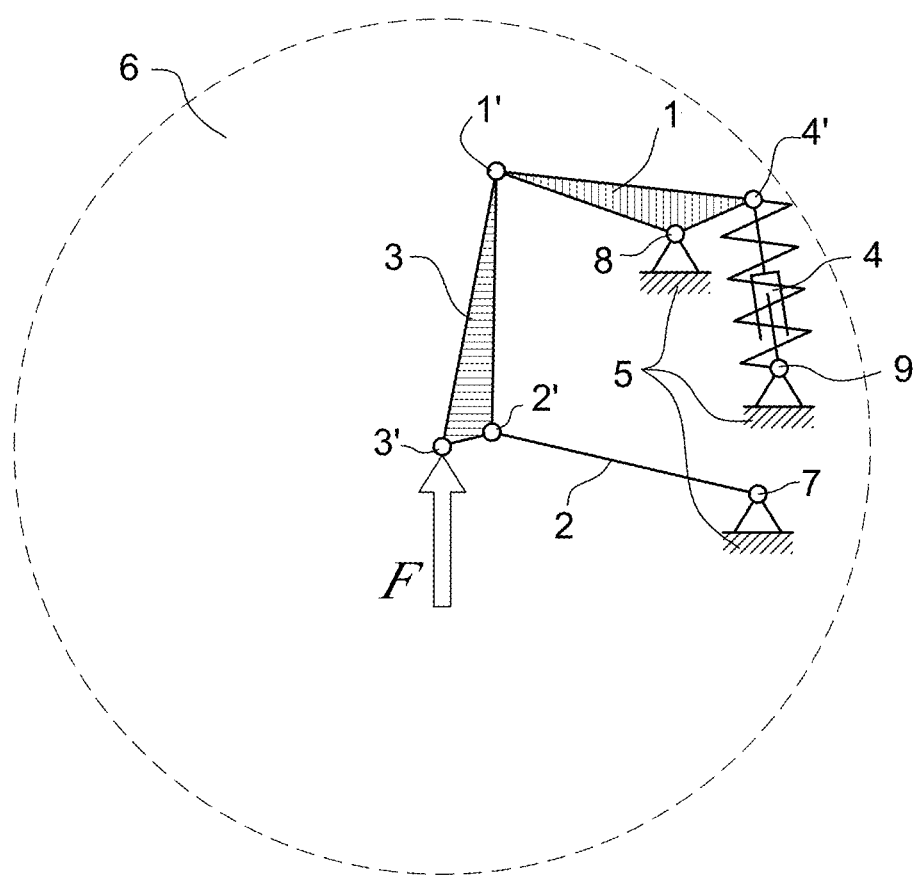
FIG. 3 illustrates the kinematic scheme of the invention. The rigid levers (1), (2), and (3), along with pivots (1)' and (2'), the frame (5), and pivots (7) and (8), form a movable four-bar linkage mechanism. The shock absorber (4) is mounted on the rigid frame (5) via pivot (9) and is connected to the upper rocking lever (1) of the four-bar mechanism through pivot (4'). The movable levers (1), (2), (3), and the elastic shock absorber (4) form a closed flat kinematic chain with two loops, which is connected to the rigid frame (5) at three points. The dynamic force F, generated by the contact between the unicycle wheel (6) and the road, is transmitted through the wheel axle (3') to the arm (3) of the four-bar linkage mechanism. This causes the upper rocking lever (1) to rotate, compressing the shock absorber (4) and effectively damping the shock caused by the force F.

In the disclosed embodiment of the suspension system, the closed kinematic chain of the suspension elements is connected to the frame (5) of the vehicle as follows (in clockwise order for the right-hand side): the member (1), referred to here as the upper rocking lever, is connected with its left end to the upper end of the member (3), here referred to as the arm. The member (1), at a distance of also of its 2/3 of its length from the left end, is pivotally connected to the frame (5), while its right end is pivotally connected to the upper end of the shock absorber (4). Further, the lower end of the shock absorber (4) is pivotally connected to the rigid parts of the frame (5), then another pivotally connected frame node connects to the right end of the lower rocking lever (2). In turn, the left end of the rocking lever (2) is connected to the lower end of the arm (3), which closes the kinematic chain by connecting pivotally to the left end of the rocking lever (1), as described above. All subsequent elements of the closed chain described here form turning kinematic pairs with each other.

The upper rocking lever (1) forms a lever between the upper end of the shock absorber (4) and the upper rocking lever (1) and with a support point, which is the connection point to the frame (5). The arm ratios of this lever are respectively about 2/3 for the upper rocking lever (1)—support point and about 1/3 for the support point—shock absorber end (4).

Figure 4:
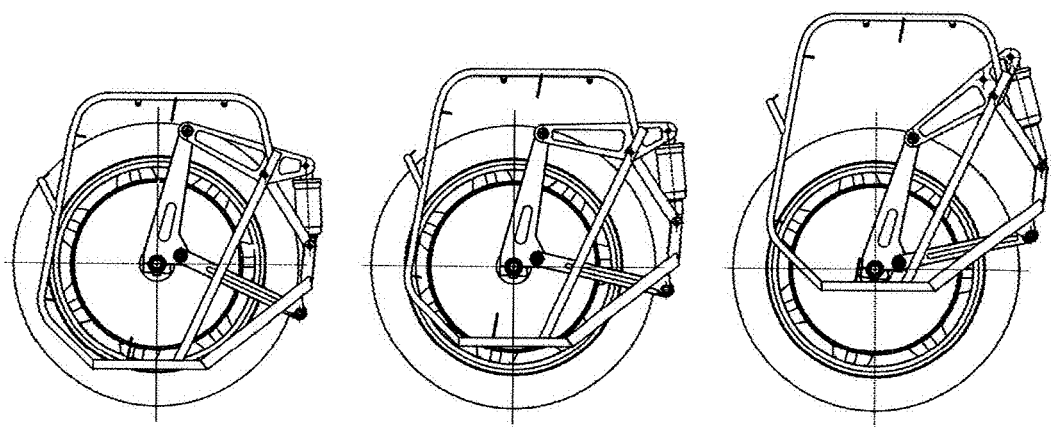

Coupling of the system of elements, which is the subject of the application, ensures parallel displacement of the upper rocking lever (1) with respect to the lower rocking lever (2), and thus provides cushioning of the mass in the vertical direction by means of a shock absorber (4), which is neither vertically nor in the axis of the mass to be cushioned. The three different positions of the cushioning system and thus the different mutual angular positions of the individual components (rigid members) are shown in FIG. 4. Advantageously, this system provides cushioning of the weight in the desired vertical direction with minimal deviation from it.

In the shock absorption system which is the subject of the application, the shock absorber (4) is pivotally connected at one end to the shorter arm of the rocking lever (1) and at the other end to the frame (5).

In a shock absorption system, the shock absorber (4) can be a standard component, used for example in bicycles, where the shock absorption process can be realised by spring compression, air compression, oil compression or any combination of these processes.

The invention claimed is:

1. A shock absorption system for an electric unicycle comprising a system of three movable rigid levers pivotally connected to each other and to a shock absorber forming a flat closed kinematic chain characterised by the fact that the kinematic chain has two interconnected loops—one resembling a trapezoid and other resembling a triangle pivotally attached to a rigid frame of the unicycle at three points, wherein
the top and bottom levers remain parallel to each other in all positions of the kinematic chain and the shock absorber, as an integral part of the closed kinematic chain, is oriented predominantly vertically at a nonzero angle relative to a direction of cushioned forces.

2. The shock absorption system according to claim 1, wherein the two closed kinematic chains are mounted in parallel on both sides of a unicycle wheel.

* * * * *